Nov. 27, 1928.

H. J. LE PUL

AIRPLANE WING STRUCTURE

Filed Jan. 12, 1927

WITNESSES

INVENTOR
Henry J. LePul
BY
ATTORNEY

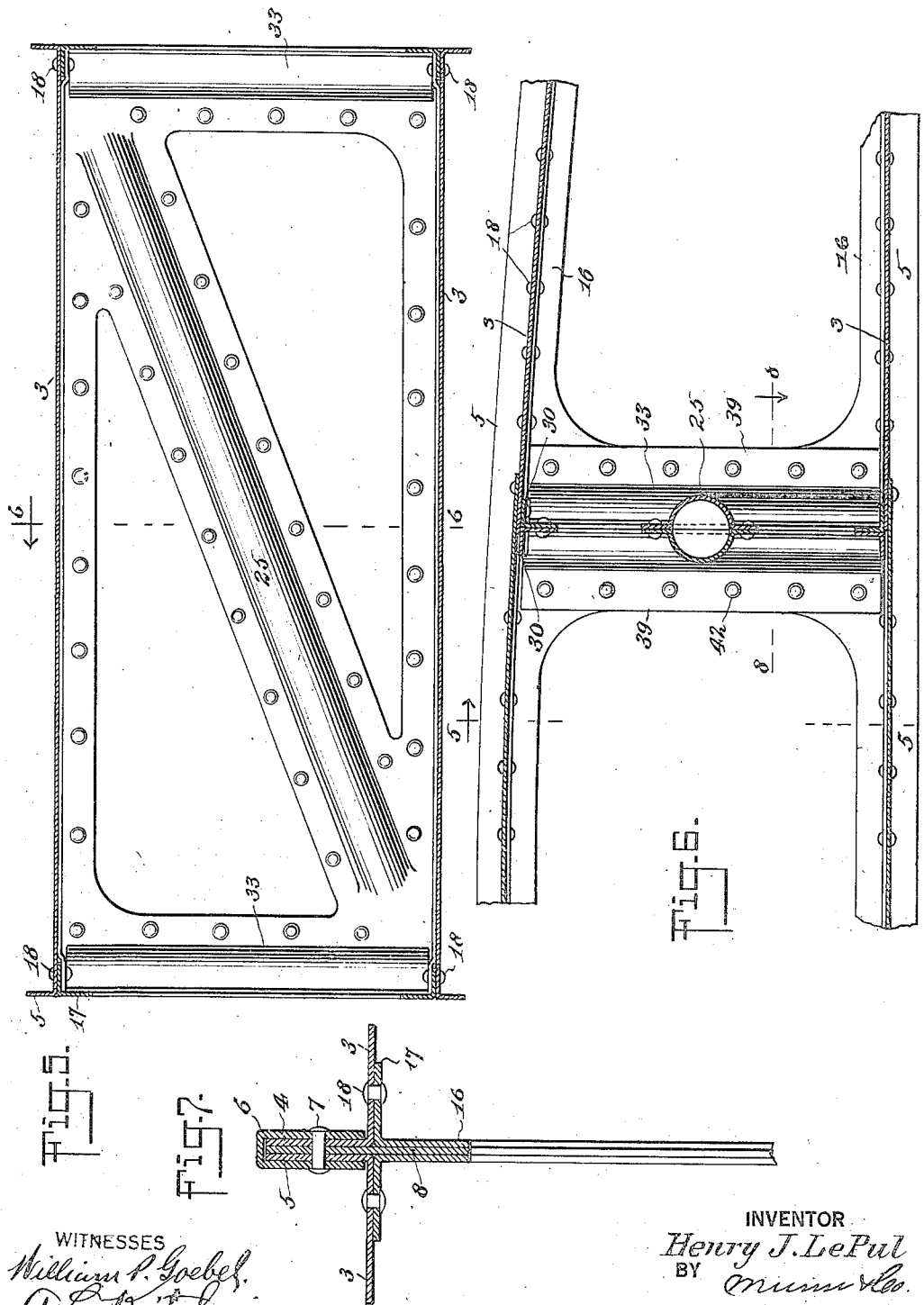

Nov. 27, 1928.
H. J. LE PUL
1,693,449
AIRPLANE WING STRUCTURE
Filed Jan. 12, 1927     4 Sheets-Sheet 4
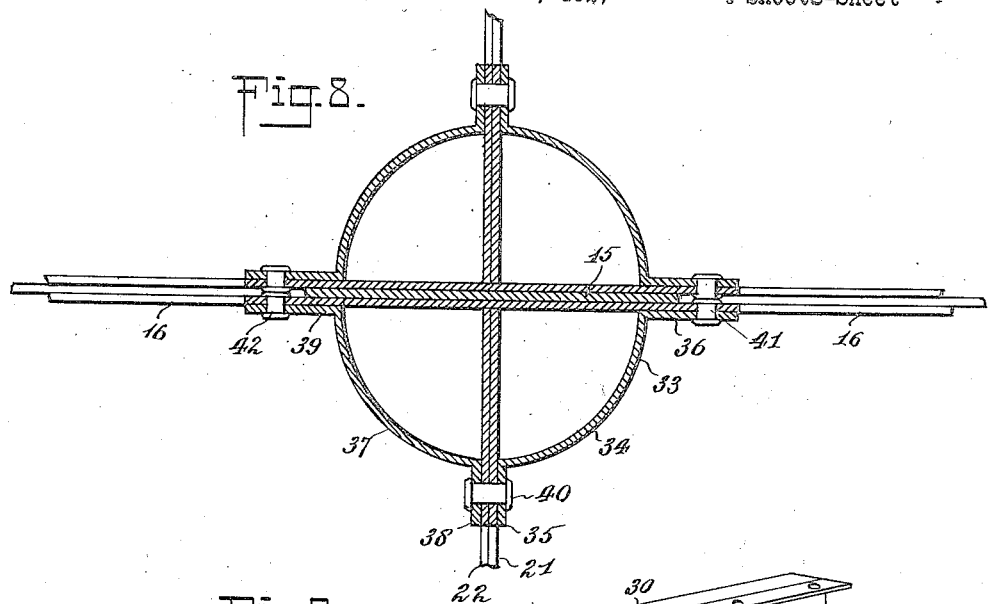
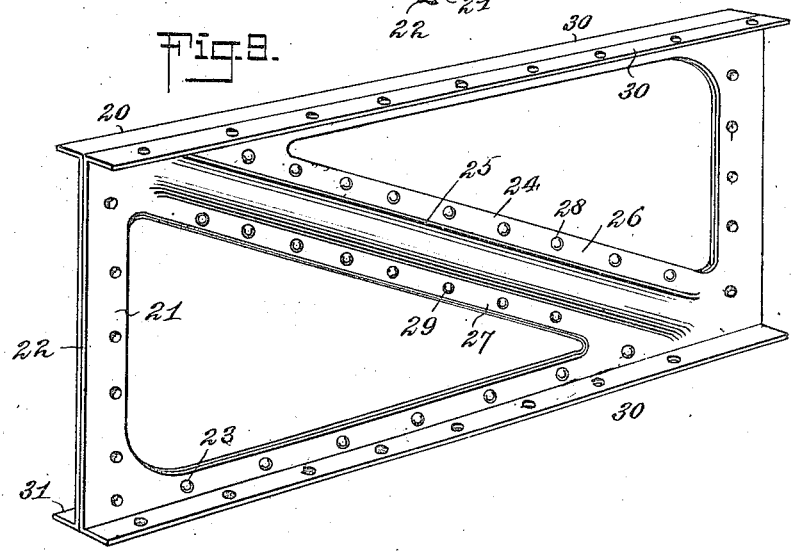
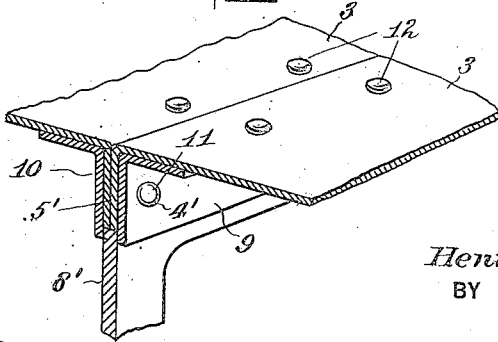
WITNESSES
INVENTOR
Henry J. LePul
BY
ATTORNEY Patented Nov. 27, 1928.

1,693,449

UNITED STATES PATENT OFFICE.

HENRY JOSEPH LE PUL, OF HEMPSTEAD, NEW YORK.

AIRPLANE-WING STRUCTURE.

Application filed January 12, 1927. Serial No. 160,676.

This invention relates to an improved wing structure for airplanes and has for an object to provide a construction wherein the different parts are made of different weights and strengths to take care of the different loads.

Another object of the invention is to provide an airplane wing made up of independent sections with means for connecting the sections together in such a manner as to present a substantially integral structure.

An additional object of the invention is to provide in an airplane wing a plurality of independent covering sheets arranged with the thickest sheets at the point of greatest strain and the thinnest at the point of least strain.

A still further object of the invention is to provide an airplane wing structure wherein a series of longitudinal braces are provided with diagonally arranged bracing members made separate or integral with the longitudinal braces.

In the accompanying drawings—

Figure 5 is a sectional view through Figure 6, approximately on line 5—5.

Figure 6 is an enlarged fragmentary transverse sectional view through Figure 1 approximately on line 6—6 and also through Figure 5 on line 6—6.

Figure 7 is an enlarged fragmentary sectional view through Figure 1, approximately on line 7—7.

Figure 8 is an enlarged sectional view through Figure 6 on line 8—8.

Figure 9 is a perspective view of a pair of bracing members similar to that illustrated in Figure 5.

Figure 10 is a perspective view of a slightly modified form of the invention to that illustrated in Figure 7.

Figure 3:
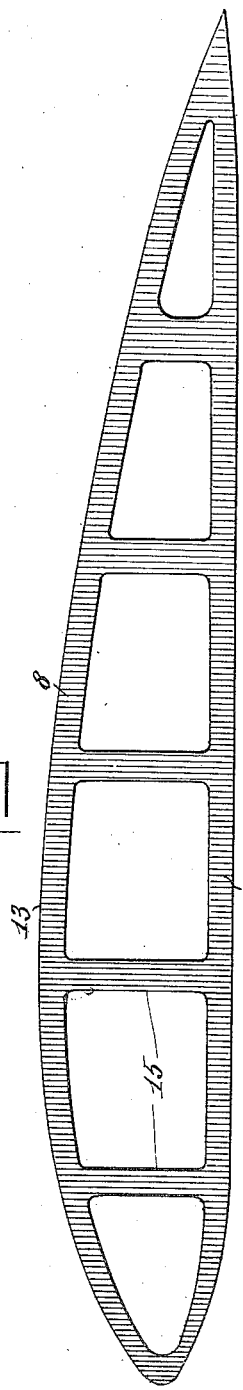
Figure 3 is an elevation of a bracing web used between two sections of the wing as illustrated in Figure 1.
Figure 4:
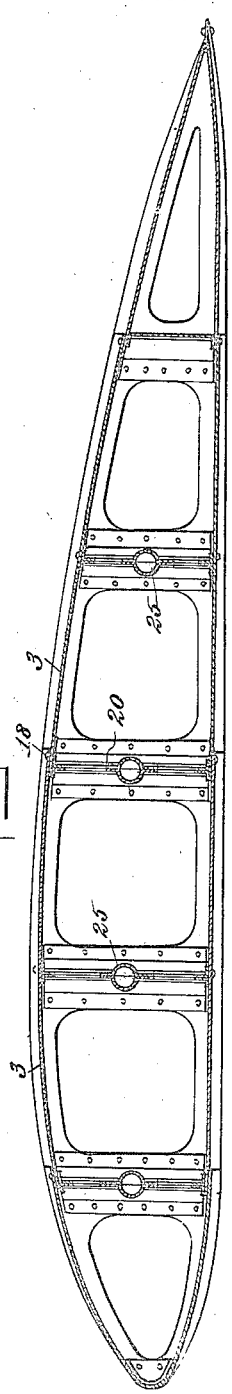
Figure 4 is a sectional view through Figure 1, approximately on line 4—4.

Referring to the accompanying drawings by numerals, 1 indicates a complete wing section and 2 a similar wing section connected by bolts or rivets to the section 1. The sections 1 and 2 are of identical construction and also the remaining sections of the entire wing structure are of the same structure. It will, therefore, be noted that a wing of any length may be made merely by adding more or less of the sections 1 or 2. As indicated in Figure 7, the upper plates 3 of the various sections are turned up for forming upstanding flanges 4 and 5 and these flanges are straddled by a member 6 substantially U-shaped in cross section. A number of rivets 7 extend through the U-shaped member 6, through the flanges 4 and 5 and through a bracing web 8. This structure as shown in Figure 7, fastens the sections together so that they are substantially one piece. Under some circumstances, instead of having the flanges 4 and 5 turned upwardly, they may be turned downwardly as shown in Figure 10. In this form of the invention, the flanges 4' and 5' are turned downwardly and preferably contact with the edge of the stiffening web 8'. The angle bars 9 and 10 connected with the plates 3 are connected to the flanges 4' and 5' by suitable rivets 11, these angle bars being in turn connected to the plates 3 by suitable rivets 12. The webs 8 and 8' are constructed as shown in Figure 3 and fit flatwise against the end of the respective sections 1 and 2 so as to provide an extra bracing structure at this point. It is, of course, evident that this web could be eliminated if desired but ordinarily it is used as the additional weight is small and the bracing power is great. It will be noted that this web is provided with an upper run or section 13 merging at the ends into a lower run or section 14 and these sections are connected with a number of vertical struts 15, the struts 15 and sections 13 and 14 being formed integral and from a single plate of material, as for instance, aluminum.

The entire wing structure 1 is made of metal and may be made of duraluminum or other metal as preferred. In forming each section there is provided an end plate 16 at each end of each section, each of the end plates having an inturned flange 17 (Figure 7) said inturned flange being secured to the plate 3 by rivets 18. Each of the plates 16 is provided with a vertical or upstanding connecting strut 19 preferably considerably wider than the struts 15 of the web 8. A bracing structure 20 is provided for each pair of struts 19. Each of the bracing structures 20 is preferably formed of two members 21 and 22, each member being preferably made of a single plate cut out of a single sheet of metal and then riveted together by suitable rivets 23. In cutting out the members 21 and 22, there is a diagonal brace structure 24 provided, said brace structure having a semi-tubular portion 25 and webs 26 and 27, said webs accommodating the rivets 28 and 29. At the top and bottom of the members 21 and 22 are arranged flanges 30 and 31, one of said flanges being riveted to the plates 3 by the rivets 32. At each end of each of the bracing members 20 a special vertical brace 33 is provided. As all of these braces are identical, the description of one will apply to all.

Figure 1:
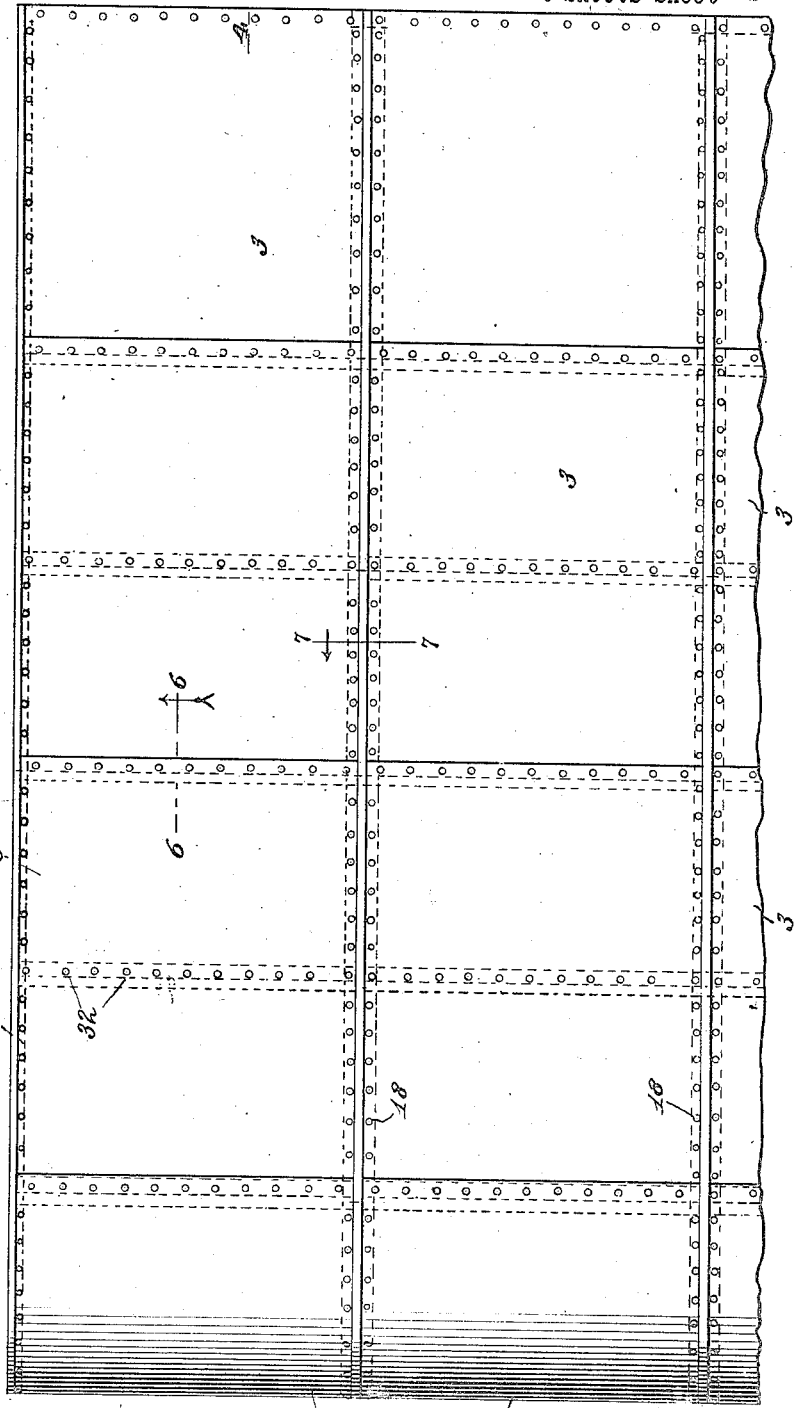
Figure 1 is a plan view of part of an airplane wing disclosing an embodiment of the invention.
Figure 2:
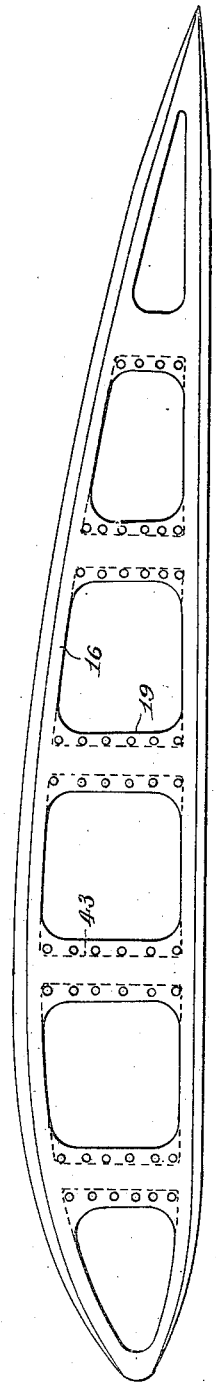
Figure 2 is an edge view of one of the sections of the wing shown in Figure 1.

As indicated in Figures 6 and 7, the brace structure 33 is provided with a partly tubular section 34 merging into flanges 35 and 36 and a similar partly tubular section 37 merging into flanges 38 and 39. Rivets 40 are provided for connecting the flanges 35 and 38 together and to the vertical end portions of members 21 and 22. The flanges 36 and 39 respectively, are connected by rivets 41 and 42 respectively to the end plate 16. It will be noted that the vertical struts 15 of web 8 are sufficiently narrow to fit in between the rivets 41 and 42 as indicated in Figure 8 and by the dotted lines 43 in Figure 2. This will allow the parts to fit flatwise together and allow a better bracing action. From Figure 1 it will be noted that a number of plates 3 are provided and riveted to the various bracing members 20. By reason of this construction the front and rear plates 3 may be comparatively thin while the center plates are comparatively thick and strong, thus providing greater strength where the greater strain occurs. Instead of using rivets for connecting the sections together as shown in Figures 7 and 10, bolts could be used though ordinary rivets are preferable as they are not so liable to become loose.

Various slight changes and alterations might be made in the general form and arrangement of the parts described without departing from the spirit of the invention, and hence I do not limit myself to the precise details set forth but shall consider myself at liberty to make such slight changes and alterations as fairly fall within the spirit and scope of the appended claims.

What I claim is:

1. An airplane wing including a wing structure having a plurality of connected sections, each of said sections comprising an outer covering structure, end plates and a plurality of interior braces, each of the interior braces including a pair of identically formed bracing members, means for securing said members together, each of said members presenting a rectangular frame having a flange at the top and bottom, and a diagonal bracing web formed with a pressed out stiffening member.

2. In an airplane wing structure an interior brace including a substantially rectangular body, and vertical end members, said vertical end members presenting a substantially semi-tubular structure with laterally extending flanges.

3. In an airplane wing, an interior brace including a substantially rectangular structure provided with an integral diagonal brace, integral top and bottom flanges, and stiffening means at each end, each of said stiffening means being formed as a half tube with laterally extending flanges.

4. An airplane wing, comprising a metallic wing structure formed of a plurality of independent sections, each section having longitudinally extending substantially rectangular braces, a stiffening web arranged between each section of a height substantially equal to the distance from the top to the bottom of the sections, clamping means extending longitudinally of the wing for connecting the sections together, and tubular stiffening means arranged at each end of said braces for stiffening the wing at the line of connection of the respective sections.

HENRY JOSEPH LE PUL.